Feb. 14, 1961 G. DIRKS 2,972,131

APPARATUS FOR SORTING SIGNALS RECORDED ON A MAGNETISABLE SIGNAL CARRIER

Filed Aug. 22, 1957 2 Sheets-Sheet 1

INVENTOR
Gerhard Dirks

BY Michael S. Striker

ATTORNEY

Feb. 14, 1961

G. DIRKS 2,972,131

APPARATUS FOR SORTING SIGNALS RECORDED ON A MAGNETISABLE SIGNAL CARRIER

Filed Aug. 22, 1957

2 Sheets-Sheet 2

INVENTOR
Gerhard Dirks
BY Michael S. Striker
ATTORNEY

1

2,972,131

APPARATUS FOR SORTING SIGNALS RECORDED ON A MAGNETISABLE SIGNAL CARRIER

Gerhard Dirks, 44 Morfelder Landstrasse, Frankfurt am Main, Germany

Filed Aug. 22, 1957, Ser. No. 679,686

Claims priority, application Great Britain Aug. 24, 1956

15 Claims. (Cl. 340—174.1)

This invention relates to apparatus for selectively transferring data items according to a succession of criteria.

It is known to repeatedly sense a plurality of data items and to record those items which conform to certain criteria. For example, numerical items may be tested for the presence of the digits zero to nine in one or more denominations in order to record the items in a sorted order, that is, in a specified numerical sequence. It will be apparent that considerable time may be wasted if the items are tested for digits which they do not contain, so that one or more idle sensing runs are performed which do not produce any rearrangement of the items.

Accordingly, it is an object of the invention to reduce the number of idle runs performed during the rearrangement of data items in accordance with a succession of criteria.

It is another object of the invention to test the data items simultaneously in accordance with a plurality of criteria.

According to the invention, apparatus for selectively transferring data items from a first to a second signal carrier in accordance wth a succession of criteria comprises means for sensing data items sequentially from the first signal carrier, first means for testing the sensed data items for conformity with one of the criteria, means for selectively recording the sensed data items on the second signal carrier under control of the testing means, second means for testing the sensed data items for conformity with at least the next criteria in said succession and means controlled by the second testing means for setting the first testing means to test subsequently either for said next criteria or for a further criteria in said succession.

The invention provides in some of its forms a data sorting device wherein in successive runs data items are transferred selectively in dependence on successive sorting signals, and wherein during each said run of the record surface through the sensing station, for sorting according to a given sorting signal, there is means for sensing the next or some other later sorting signal and, if there is no occurrence of that next or other sorting signal, switch means becomes operative to skip the sorting process for the next or later run of the record surface to the next following sorting signal.

Figure 1:
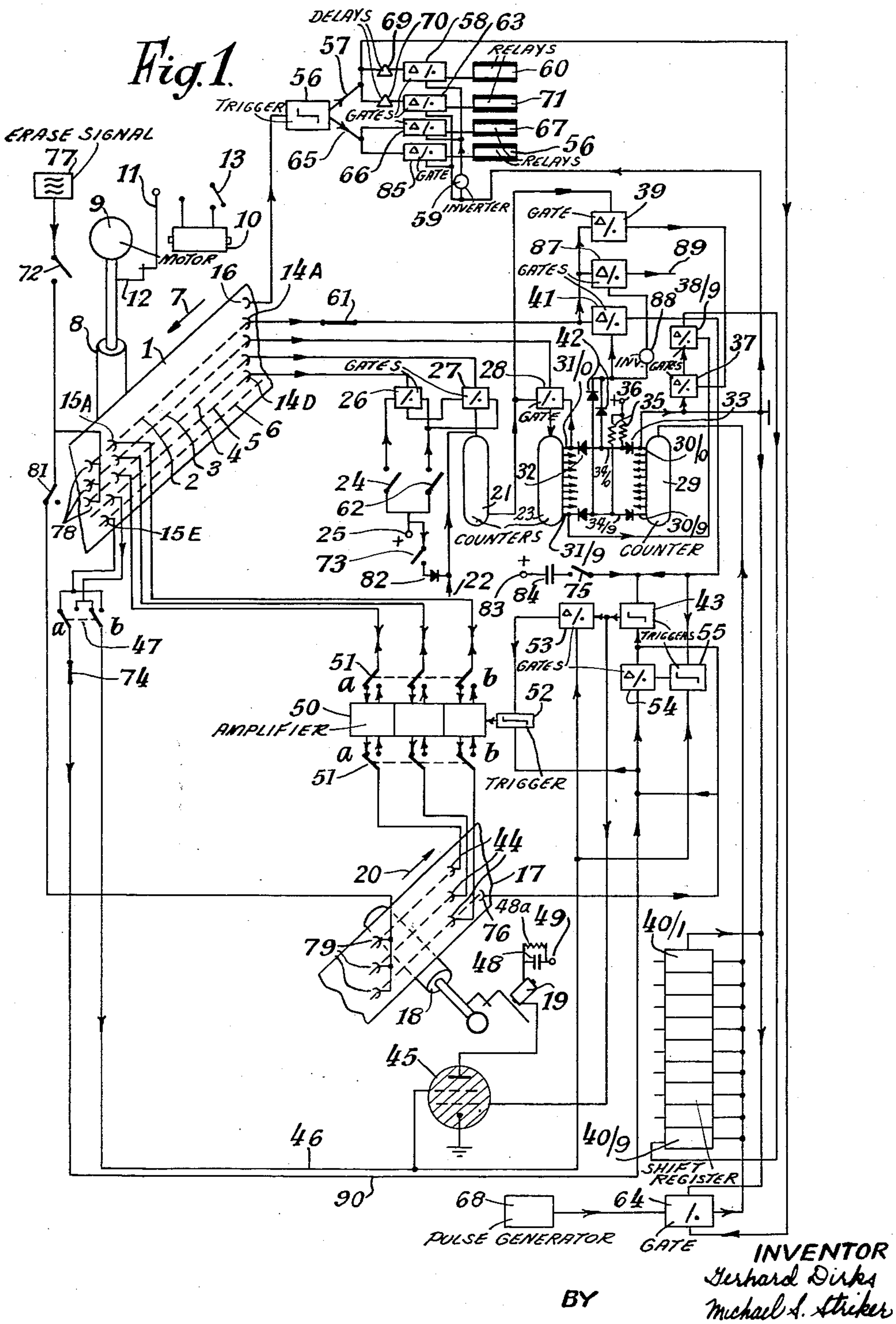
Figure 2:
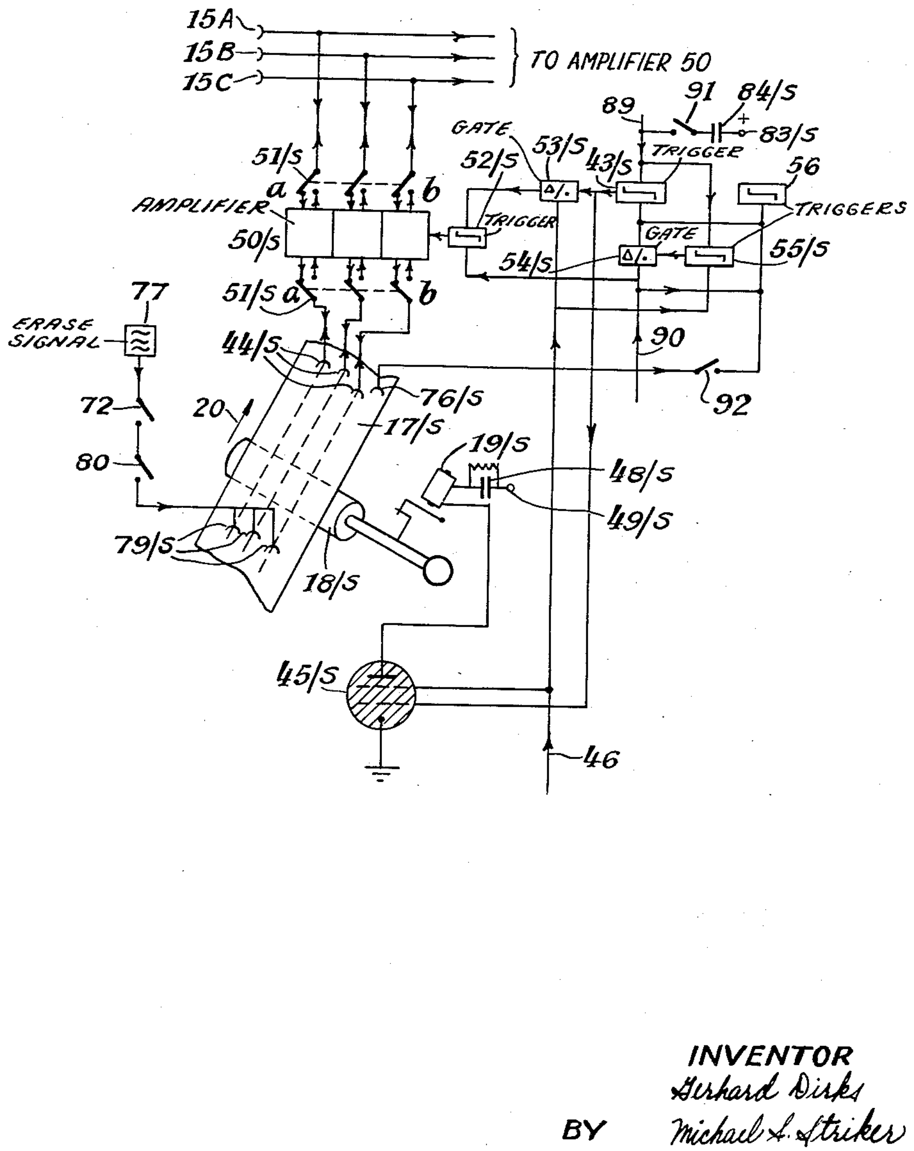

In order that the present invention may be readily carried into effect, it will now be described with reference to the accompanying drawings, in which:

Fig. 1 is a schematic block diagram of an embodiment of a circuit arrangement for effecting data sorting; and Fig. 2 is a schematic block diagram of an embodiment of a control circuit for a second temporary storage tape.

The data to be sorted is recorded on a magnetic tape 1 in the form of magnetic marks disposed on five tracks 2, 3, 4, 5 and 6. The data comprises a plurality of groups of digits, the beginning and end of each group being indicated by marks on tracks 5 and 6 respectively. The beginning of each digit within a group is indicated by a mark on track 4 and the end of the digit by a mark on track 2. Associated with each digit are ten marks on track 3. The value of a digit is indicated by the position of a mark on track 2 with respect to the associated marks on track 3 and is numerically equal to the number of marks on track 3 which are sensed between the occurrence of a mark on track 4 and a mark on track 2. An exception to this is the value "0" which is represented by ten marks. When tape 1 is driven forwards in the direction of arrow 7, marks are sensed in the following order: a group start mark (track 5); a digit start mark (track 4); a certain number, from one to ten, of digit marks (track 3); an end of digit mark (track 2); the remainder of the digit marks (track 3); the next digit start mark and so on until an end of group mark on track 6.

Sub-groups of selected consecutive digits in each group are sorted in dependence on their value in such a way that the groups are arranged afterwards in progressive sequence according to the sub-group value.

The process of sorting can best be described by means of an example in which it will be assumed that each group consists of eighty digits and that sorting is to be effected according to the numerical value of the three-digit sub-group comprising the thirtieth, thirty-first and thirty-second denomination of each group, counting from the beginning of the group. The order of groups as originally recorded on tape 1 is entirely random. During the forward run of the first phase of sorting (abbreviated for convenience to "forward phase one") all groups having a thirty-second denomination of which the value is "0" are transferred to a temporary storage tape. During this run indications of the occurrence of other values of this denomination are stored, so that if any digit values do not occur, the corresponding phase of sorting can be omitted to prevent an idle sorting run taking place.

At the end of forward phase one, tape 1 is rewound (backward phase one) and the second phase commenced during which groups which have a "1" in the thirty-second denomination are transferred to the temporary storage tape. Tape 1 is again rewound and the process is repeated (except for absent digits which are skipped) for digit values up to nine. At the end of forward phase ten all the groups of digits will have been transferred from tape 1 to the temporary storage tape. During backward phase ten, the contents of the temporary storage tape are transferred in order to tape 1 and erased from the temporary storage tape.

This sequence of ten sorting phases is then repeated for values of the thirty-first denomination and again for those of the thirtieth. At the conclusion sorting tape 1 contains the original groups of digits, but now they are ordered in progressive sequence of sub-group value. During the first phase of sorting in each denomination, the values of that denomination are inspected to control the skipping of any unnecessary phases.

The schematic symbols used in the drawings to represent known circuit elements will be described briefly to facilitate the understanding of the invention. A gate circuit which is opened and closed by a control voltage is represented by a box containing a triangle and a symbolic switch. A gate which is opened and closed by a pulse is indicated by a box containing a symbolic switch. A trigger is indicated by a box containing a representation of a step function waveform. An oscillator is represented by a box containing three sine waves.

Tape 1 is traversed between two spools (not shown) by means of a roller 8 driven via a friction clutch by a reversible motor 9. Movement of the tape is controlled by a start-stop arrangement shown schematically by an electromagnet 10, an associated armature 11 and a lever 12 which is secured to the shaft of roller 8. When the magnet is energized by closing a switch 13, armature 11 is attracted and frees the lever 12, permitting the roller to rotate.

The recording and sensing of the magnetic marks on tape 1 are effected by a group of heads 14A–D cooperating with tracks 2 to 5 respectively and a second group of heads 15A–E cooperating with tracks 2 to 6. The two groups are spaced apart along the direction of travel of the tape by a distance equal to that occupied by a group of digits, that is the distance between a group start mark and the associated end-of-group mark. A head 16 senses an end-of-tape mark placed at each end of the tape on a portion of the tape not occupied by tracks 2–6.

A temporary storage tape 17 is traversed by means of a roller 18 driven through a friction clutch by a reversible motor (not shown). The rotation of roller 18 is controlled by an electromagnet 19. When the magnet is momentarily energized, the shaft carrying the roller makes one revolution and the diameter of the roller is such that the tape is driven through a distance equal to one group length. Forward direction of travel of the temporary storage tape is indicated by arrow 20.

Selection of the sub-group on which sorting is to take place is effected under control of a counter 21, the capacity of which corresponds to the number of digits in a group. The counter is preset, by pulses applied to a lead 22, with a number which equals the full capacity less the highest denomination on which sorting is to take place. In the example given above, there are eighty digits in each group and sorting is effected on the thirtieth, thirty-first and thirty-second denominations. Counter 21 is therefore preset to the value "48" by the application of this number of pulses over lead 22.

Pulses generated by the digit start marks on track 4 are entered into the counter which gives an output after thirty-two marks have been sensed. This output is used to control the transfer of the thirty-second digit to a selector 23. After another eighty pulses the counter 21 will again give an output to control the transfer of the thirty-second digit of the next group and so on. Before the commencement of sorting on the second denomination of the sub-group, the preset count is increased by one so that the thirty-first digit of each group is transferred to selector 23. Before sorting is effected on the third denomination of the sub-group, the count is again increased by one to effect transfer of each thirtieth digit.

The sorting process is initiated by closing contacts 13 so that tape 1 is driven forwards. A contact 24 is closed to complete a circuit between a positive terminal 25 and a gate 26. This opens the gate 26 and permits group start signals from head 14D to open a gate 27 which is controlled by digit-start signals from head 14C. The output of gate 27 is fed to counter 21 so that after a group-start mark on track 5 has been sensed, digit start pulses are fed to the counter which produces an output after thirty-two pulses, as already described. The output from the counter opens a gate 28 which permits digit pulses from head 14B to pass to selector 23. The selector comprises a counting tube which is advanced one position for each of the pulses generated by the marks on track 3. In the present embodiment a ten-denomination counting tube is employed because sorting is effected on decimal digits, but obviously if the digits are recorded in another notation a counting tube having the appropriate capacity may be used.

A similar selector 29 is used to control the phase of the sorting operation.

The output from selector 23 appears on one of ten lines 31/0 to 31/9 in dependence on the registered value and the output from selector 29 appears on a corresponding set of ten lines 31/0 to 31/9. Lines 31/0 to 30/0 are connected to the cathodes of diodes 32 and 33 respectively. The anodes of the diodes are connected together by a line 34/0 which is connected via a resistor 35 to a positive terminal 36. Diodes 32, 33 and resistor 35 form a coincidence circuit such that if the voltage of both output lines 31/0 and 30/0 is high (representing selected lines), the voltage of line 34/0 is high, but if either one or both output lines are low (representing unselected lines) the voltage of line 34/0 is low. Similar coincidence circuits are controlled by the other corresponding pairs of output lines 30 and 31.

During the first phase of sorting the voltage of lines 30/0 is high and two operations are carried out, namely (*a*) the value of each thirty-second denomination is determined and used to set a corresponding stage of a shifting register in order to control skipping of unnecessary phases, and (*b*) the occurrences of digit value "0" are used to set a trigger which controls the transfer of the associated group of digits from tape 1 to the tape 17.

Operation (*a*) will first be described. Line 30/0 controls a gated amplifier 37, the output of which feeds nine similar amplifiers of which only one, 38/9 is shown. The amplifiers 38 are controlled by corresponding outputs from selector 23, thus amplifier 38/9 is rendered operative by an output on line 31/9. End-of-digit pulses from head 14A are applied, via a gated amplifier 39 controlled by the output from counter 21, to gate 37. Thus during each thirty-second denomination the selector 23 is driven through ten steps and the amplifiers 38 are rendered operative in turn so that a pulse from head 14A will result in an output from that amplifier which corresponds to the digit value.

The outputs of amplifiers 38/1 to 38/9 are taken to successive stages 40/1, to 40/9 of a shifting register which controls subsequent sorting phases. Since the first phase of sorting must always be carried out, there is no amplifier 38 controlled from line 31/0. At the end of forward phase one, some or all of the stages of the register will have been set "on" by the first occurrence of the corresponding digit. Stages which remain "off" indicate that the corresponding digit does not occur in the denomination being inspected.

The operation (*b*) mentioned above is effected as follows. Lines 34/0 to 34/9 control a gated amplifier 41 via isolating diodes 42. The input to the amplifier 41 is provided from head 14A so that if the thirty-second denomination has value "0," amplifier 41 operates. If, however, it has value other than "0," the settings of selectors 23 and 29 will not coincide at the time an end-of-digit mark is sensed, so that no output is obtained from amplifier 41. The output from amplifier 41 switches a trigger 43 "on" to indicate that the group of digits under heads 14 is to be transferred to tape 17. At the end of each digit selector 23 is at "0" and the output on line 31/0 closes gate 28 which is next opened by the output from counter 21 eighty digits later.

Trigger 43 controls the operation of tape 17 to permit the whole group of digits to be transferred to that tape from tape 1. This is effected by reading the data from tape 1 by means of heads 15 and recording them on tape 17 by means of a group of three heads 44. Since heads 14 and 15 are separated by a group length, trigger 43 is set before the associated group start mark is aligned with head 15D permitting all digits in the group to be transferred.

Magnet 19 controlling the movement of tape 17 is energized by the operation of a gas tube 45. The output of trigger 43 is used to bias the first control grid of the tube 45. The second control grid of the tube 45 is connected to a line 46 which receives a pulse, via changeover contacts 47 from head 15D, so that said tube fires when a group start mark is sensed by the head. The cathode of the tube 45 is connected to ground and the anode is connected through magnet 19 and a series capacitor 48 shunted by a high value resistor 48*a* to a positive terminal 49. When the tube 45 fires the capacitor charges through the magnet, causing roller 18 to be released for one revolution to drive tape 17 forward for a distance equal to one group of digits. As the capacitor charges, the anode voltage falls until a value is reached at which the discharge in the tube 45 cannot be sustained. At this point the tube 45 becomes non-conducting and the capacitor discharges through a leakage path.

Inserted in the circuit between heads 15 and 44 is an amplifier 50, the output and input connections of which can be interchanged by means of contacts 51. When these are in position *a* (as shown) the amplifier operates to record data sensed from tape 1 on to tape 17. When the contacts are in the opposite position *b*, the amplifier connections are reversed and data from tape 17 can be recorded on tape 1.

Amplifier 50 is rendered operative by means of a trigger 52 which is switched "on" by a group start pulse passed by a gated amplifier 53. The gated amplifier 53 is rendered operative by the output from trigger 43. Trigger 52 is switched "off" by an end-of-group pulse in a line 90 from head 15E. Amplifier 50 is therefore rendered operative for the duration of a group of digits to transfer the marks on tracks 2, 3 and 4 of tape 1 to three tracks on tape 17. At the end of the group a pulse from head 15E switches trigger 52 "off," rendering amplifier 50 inoperative. The end-of-group pulse is also passed by a gated amplifier 54 to switch trigger 43 "off."

While the digits of one group are being transferred by heads 15, those of the next group are being sensed by heads 30 so that an output from amplifier 41 may occur before an end-of-group mark is sensed by head 15E. In this case trigger 43 is required to be retained "on" in order that this group may also be transferred to tape 17. This is effected by preventing the pulse from head 15E from switching trigger 43 "off." The gated amplifier 54 is controlled by a trigger 55 which is switched "on" by a pulse on line 46 and "off" by the output from amplifier 41, so if there is no output from amplifier 41 during a transfer to tape 17, trigger 43 is switched "off" at the end of the group, as already described. If, however, an output from amplifier 41 has occurred, trigger 43 will be left "on," thus biassing the tube 45 which is fired by the immediately succeeding group start pulse on line 46.

At the end of forward phase one, after all the data on tape 1 has been sensed, head 16 senses the end-of-tape mark. This serves to control the change-over from forward phase one to backward phase one and to alter the setting of selector 29 in preparation for the next forward sorting phase.

The output from head 16 switches a trigger 56 "on." In switching "on" the trigger produces a pulse on a line 57 which controls a gate 64. Gate 64 permits pulses from a pulse generator 68 to be fed to the stages 40 of the shifting register whereby data in the register is shifted one position towards stage 40/1 for each pulse. Pulses from gate 64 also control the selector 29 which is stepped along in synchronism with the shifting register. The output from stage 40/1 closes gate 64.

It will be seen that if stage 40/1 was "on," one pulse only will be fed to selector 29 and the line 30/1 will be high during the next forward sorting phase. If, however, no digits of value "1" occur in the thirty-second denomination, stage 40/1 will be "off" and pulses will be applied to selector 29 until the next output from the shifting register occurs. Selector 29 is thus stepped through unnecessary phases and remains set at the next phase on which sorting is required.

The pulse on line 57 passes through a delay circuit 69 to the input of a gated amplifier 58 controlled by line 30/0 through an inverter 59 in such a manner that the amplifier 58 is operative when selector 29 registers any digit except "0." By reason of delay 69, at least one pulse from gate 64 is fed to selector 29 before the input pulse to amplifier 58 occurs, with the result that the voltage of line 30/0 is low and an output is obtained from the amplifier. This output actuates a relay 60 which reverses the motor driving tape 1, and closes contacts 62. Contacts 62 permit a positive pulse from terminal 25 to be fed to the control input of gates 26 and 27 whereby the gates are closed to prevent counter 21 and selector 23 from operating while tape 1 is being rewound. Since no output from counter 21 will occur during backward phase one, gate 28 remains closed and selector 23 continues to register "0" whereas selector 29 registers "1" (or whichever phase is to be next effected) so that no output is possible from the coincidence circuit and trigger 43 remains "off."

When tape 1 is fully rewound another end-of-tape mark is sensed by head 16 and trigger 56 is switched "off." In switching "off" a pulse is produced on a line 65 connected to the input of a gated amplifier 66 controlled by the inverter 59. The output of amplifier 66 operates a relay 67 which controls the change-over from backward phase one to the next forward phase. The relay reverses the drive to tape 1, and closes contacts 24 to initiate the next forward sorting phase. This phase is effected exactly as for phase one except that as the voltage of line 30/0 is low, amplifier 37 is inoperative and no output is obtained from any of the amplifiers 38.

The remaining sorting phases are similarly effected up to the end of the last forward phase. Because at this time all stages 40 of the shifting register are "off," an output from line 30/0 is used to close gate 64. Thus at the end of the last sorting phase, whichever phase it may be, selector 29 is left set at "0" in readiness for the first phase of the next denomination. Since the input to inverter 59 is derived from line 30/0, amplifier 58 is inoperative. A gated amplifier 63 is rendered operative by the potential of line 30/0. The input to the amplifier is derived from line 57 via a delay circuit 70, and the output of the amplifier actuates a relay 71.

At the end of the last forward phase all the data on tape 1 has been transferred to tape 17 and is in ascending order with respect to the digit value of each thirty-second denomination. During the next backward phase tapes 1 and 17 are reversed and the date on tape 17 is transferred to tape 1. To make this possible, the original data is erased from tape 1 immediately prior to the transfer of data from tape 17 and as the data on tape 17 is no longer required after transfer it is erased in preparation for the next sorting run.

Relay 71 reverses the tape driving motors, changes over contacts 47 and 51 from position *a* to position *b*, closes contacts 62, 72, 73 and 75 and opens contacts 74. Contacts 51 reverse the connections of amplifier 50 permitting data sensed by heads 44 to be recorded by heads 15A to 15C; contacts 47 reverse the resulting effect of the marks on tracks 5 and 6, this is necessary because when tape 1 travels in backward direction, marks on track 6 are sensed before each group and marks on track 5 after each group. Contacts 72 connect an erase waveform generator 77 to erase heads 78 and through normally closed contacts 81 to heads 79. Heads 78 cooperate with tracks 2, 3 and 4 of tape 1 and are positioned so that when the tape moving in the backward direction data on the tape is erased before reaching heads 15A to 15C. Heads 79 cooperate with the three tracks on tape 17 and erase the data after it is sensed by heads 44 on the backward run. Contacts 73 permit a pulse from terminal 25 to be fed via a diode 82 to counter 21, increasing its count by one, whereby when the next forward phase one is commenced, the thiry-first denomination of each group is selected for transfer to selector 54. Contacts 75 permit a pulse from a terminal 83 to pass, via a capacitor 84 to set trigger 43, thereby rendering amplifier 53 operative and biassing the tube 45. Contacts 74 break the circuit between head 15D and trigger 52 so that the trigger, when "on," cannot be switched "off" by end-of-group pulses. Instead triggers 43 and 52 are switched "off" at the conclusion of the run by a pulse from a head 76 which senses an end-of-tape mark on tape 17. During this backward phase amplifier 41 produces outputs when marks on track 2 are sensed but as trigger 43 is already "on" the output is ineffective.

When all the groups of digits have been transferred in order from tape 17 to tape 1 and the data on tape 17 erased, a mark is sensed by head 16 and trigger 56 is switched "off." As the voltage of line 30/0 is high there is no output from inverter 59 and amplifier 66 remains inoperative. An amplifier 85 controlled by line 65 and rendered operative by the line 30/0 actuates a relay 86 which resets all the contacts operated previously by relay 67 and reverses the drive to tape 1.

Relay 86 also closes contacts 24 to open gate 26. Sorting is then carried out on the thirty-first denomination. At the end of the last forward phase the count registered by counter 21 is again increased by one so that a sorting operation can be carried out on the thirtieth denomination.

At the conclusion of the last backward phase of sorting on the thirtieth denomination, contacts 13 are opened by a control unit (not shown) and sorting ceases. The groups of digits are now arranged on tape 1 in progressive order according to the sub-group value.

Although a three-denominational sub-group has been chosen as an example, it will be obvious that the sub-group can be of any size up to the full group length.

The circuit has been described as used for a complete ordering of all groups on tape 1. It can be used, however, for selecting all groups having a chosen value in a predetermined denomination. The denomination is selected by presetting counter 21 and the digit value is selected by presetting selector 29 to that value. After one forward run all the required groups will be transferred to tape 17.

By a modification the converse of this is possible, namely to transfer to tape 17 all groups not having the selected digit value. This is effected under control of a gated amplifier 87 which is controlled via an inverter 59 from the cathodes of diodes 42. The input to amplifier 87 is derived from head 14A and the output on a line 89 is used to set trigger 43 and 55 instead of using the output of amplifier 41 for this purpose. Groups are thus transferred to tape 17 when the setting of selectors 23 and 29 do not coincide.

A second embodiment of the invention uses two temporary storage tapes. In each forward phase of sorting groups (which will be referred to as selected groups) having the selected digit value, are transferred to the first temporary storage tape, and the remaining, unselected, groups to the second temporary storage tape. On the backward phases the data on the second tape is transferred to tape 1 for further sorting. The number of groups on tape 1 to be sorted diminishes, therefore, at each phase and sorting time per denomination is reduced.

Control means for a second temporary storage tape 17/S are shown in Fig. 2. Units which have the same function as the corresponding units in Fig. 1 bear the same reference number but with a suffixed /S. Amplifier 50/S is connected in parallel with amplifier 50 to heads 15A to 15C but it is operative only when amplifier 50 is inoperative. This is effected by controlling trigger 43/S from line 89 whereby selected groups are transferred to tape 17 and the remaining unselected groups to tape 17/S.

Forward phase one will be briefly described by assuming that a selected group is followed by two unselected groups. The transfer of the first group to tape 17 is effected as in the first embodiment: trigger 43 is switched "on" by the output of amplifier 41 and the start pulse on line 46 fires the tube 45 and switches trigger 55 "on." Trigger 43/S is "off" so that the tube 45/S is not biassed and does not fire. As the next group has to be transferred to tape 17/S, an output from amplifier 87 switches trigger 43/S "on." An end-of-digit pulse on line 90 switches triggers 52 and 43 "off," but trigger 43/S remains "on" as trigger 55/S is "off" at this time and amplifier 54/S is inoperative. The next pulse on line 46 initiates the transfer to tape 17/S and switches trigger 55/S "on." As the next group has also to be transferred to tape 17/S, a pulse on line 89 switches trigger 55/S "off." The next end-of-group pulse on line 90 only switches trigger 52/S "off"; trigger 43/S remains "on" to permit the next group to be similarly transferred to the same tape.

At the beginning of backward phase one, contacts 72 are closed and contacts 81 opened so that data on tape 1 is erased and data from tape 17/S can be recorded on it. Contacts 80 are also closed to connect erase heads 79/S to the generator 77. Data on tape 17 is not erased nor is it transferred to tape 1.

Relay 60 opens contact 74 and closes contacts 91 to permit a positive pulse from terminal 83/S to switch trigger 43/S "on." The relay also changes over contacts 51/S and closes contacts 92, the use of which will be described later. Contacts 61 in the circuit of head 14A are opened to prevent the operation of amplifier 87.

During backward phase one all the data on tape 17/S is transferred to tape 1. An end-of-tape mark on tape 17/S is sensed by a head 76/S and a pulse is fed via contacts 92 to switch "off" triggers 52/S, 43/S and 56. Transfer of data is thus concluded and relay 67 resets the contacts to effect the next forward phase.

It will be seen that as the groups on tape 17 have not been transferred back to tape 1, tape 1 is not driven back to its original starting point, but starts its next forward movement from the point it reached when head 76/S sensed the end-of-tape mark on tape 17/S.

The other sorting phases are similarly effected up to the end of the last forward phase when all the groups are in order on tape 17. In the last backward phase they are then transferred to tape 1 in the manner already described. Relay 86 does not close contacts 91 so that tape 17/S is not operated, there being no data on it to transfer.

It will be seen that the last sorting phase is unnecessary as only the groups of the last phase are on tape 17/S at the end of the penultimate forward phase. Assuming that both "8" and "9" digit values are present, the digit groups "0"–"8" are on tape 17 and the groups containing "9" are on tape 17/S at the end of forward phase nine. Stage 40/1 only of the shifting register will be "on." If the occurrence of a single "on" stage is sensed it may be used to control the transfer of data in backward phase nine whereby the groups on tape 17/S are transferred to tape 1, followed by those on tape 17. At the end of backward phase nine, all the groups are, therefore, in order on tape 1 and phase ten can be omitted.

Since the information controlling the suppression of idle runs is obtained concurrently with the transfer of digit group "0," an idle sorting run will occur if there are no digit groups containing zero in the particular denomination, which is controlling sorting. This can be avoided by arranging that the register 40 is set up in accordance with the next denomination to be sorted. The first run of all is idle except for loading the register in accordance with the first denomination to control sorting. At the start of each subsequent run, the register is tested to determine whether that run is the last for the particular denomination and, if it is the last, the register is loaded in accordance with the next denomination to control sorting. This procedure eliminates all idle runs except the first run, if it is assumed that each denomination contains significant digits.

The arrangement may also be simplified to test for the presence of one digit value during the sorting run for the previous digit value. Thus, when transferring the digit group "0" a test is made for the presence of the digit value "1" only, and so on. This reduces the register to a single stage, but an idle run will occur if the two successive digit values are missing.

Several temporary storage tapes may be employed to allow two or more digit values in a denomination to be transferred during a single run of the original data. In such a case, the selector circuit is modified to load the register with information relating to the next group of digits to be sorted.

It will be appreciated that the arrangement may be modified to deal with data recorded in other codes, such as binary-coded decimal, or a six element code representing alphabetic characters as well as digits. Data recorded in binary coded decimal, for example, may be sorted by first selectively transferring to the temporary storage tape in each run only those digit groups with a digit which contains a particular code element and then transferring all the remaining digit groups in order. The register thus needs to store only the occupied code element positions and not the actual digit values or characters.

The data may be recorded on tracks of a magnetic drum or drums, rather than on tapes. The temporary storage drum may be rotated in a step-by-step manner under control of the tube 45, or said tube may control switching from track to track, one group of digits being recorded in each track. Alternatively, punched paper tapes may be used. Since such tapes are not erasable, a tape will only be run in a forward direction during transfer to that tape, so that an unused portion of the tape is always available for punch.

The respective gating circuits and counting devices are in themselves well known in the art. Examples may be found in U.S. application Serial No. 617,523, filed October 22, 1956.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Apparatus for selectively transferring, from a first to a second signal carrier in accordance with a succession of criteria, data items recorded on the first signal carrier, comprising means for sensing data items sequentially from the first signal carrier during a first sensing operation, first testing means for testing the sensed data items for conformity with one of the criteria, means for selectively recording the sensed data items on the second signal carrier under control of the testing means operative during said first sensing operation, second testing means for testing the sensed data items for conformity with the next criteria in said succession control means operative on completion of the sensing of all the data items in said first sensing operation, first means responsive to operation of the control means to initiate a second sensing operation in which the data items recorded on the first carrier are again sensed by said sensing means and second means responsive to operation of the control means and to the result of the tests performed by said second testing means to set the first testing means in accordance with the criterion to be tested for in said second sensing operation, the first testing being set for said next criteria for one result from the second testing means and for a further criterion in said succession for another result from the second testing means.

2. Apparatus as claimed in claim 1, in which the second testing means is operative to test simultaneously for a plurality of criteria and to store the results of such testing.

3. Apparatus for sorting character-containing data items recorded on a first signal carrier in random order, in which those data items containing a selected character are recorded on a second signal carrier during a single sorting run, comprising, means for sensing the data items recorded on the first signal carrier, first testing means operative during one sorting run to test each sensed data item for the presence of said selected character, means controlled jointly by said sensing and testing means to effect recording on said second signal carrier of all those data items containing said selected character, second testing means operative during said one sorting run to test each sensed data item for the presence of a character other than said selected character and means operative on completion of said one sorting run to set the first testing means to test for said other character if the second testing means detected said character and to test for a further different character if the second testing means did not detect said other character, to prepare said first testing means for the next sorting run.

4. Apparatus as claimed in claim 2, in which each data item comprises a plurality of character positions, and in which each testing means includes selecting means settable to select a particular character position for testing.

5. Apparatus as claimed in claim 3, in which each signal carrier comprises a magnetic tape adapted to have data items sensed and erased therefrom and recorded thereon.

6. Apparatus as claimed in claim 5, in which each data item comprises a plurality of character positions with each of which is associated a marker signal, or signals.

7. Apparatus as claimed in claim 6, in which a particular character position of each data item is selected for testing under control of a counter which is operated in response to the sensing of said marker signals.

8. Apparatus as claimed in claim 7, in which the counter is operative to select different character positions of each data item for testing by the first and second testing means respectively.

9. Apparatus as claimed in claim 7, in which the first testing means includes a first storage device settable to represent in turn the characters in the selected character positions of the data items, a second storage device settable to represent any one of a plurality of characters forming the criteria for transfer, means for comparing the settings of the two storage devices and means operative to cause the recording means for the second signal carrier to record a data item which contains the same selected character as that represented by the setting of the second storage device.

10. Apparatus as claimed in claim 9, in which the second testing means includes a third storage device operative to store a representation of the presence or absence of each of a plurality of characters in the selected character position of any of the data items and means operative to set the second storage device under control of the third storage device.

11. Apparatus as claimed in claim 10, in which the last data item is followed by an end of tape marker signal and the means operative to set the second storage device under control of the third storage device is operable in response to the sensing of the end of tape marker signal.

12. Apparatus as claimed in claim 11, in which the first and second storage devices each comprise a counter.

13. Apparatus as claimed in claim 12, in which the third storage device comprises a shifting register.

14. Apparatus as claimed in claim 1, in which the second signal carrier is driven past the recording means in a step by step manner under control of signals sensed from the first signal carrier.

15. Apparatus as claimed in claim 14, in which the data items are sorted into numerical sequence, and in which the presence or absence of the digit values 1–9 in a particular denomination is determined during the transfer of data items in accordance with the presence, or absence, of the digit value zero in the same denomination.

References Cited in the file of this patent

UNITED STATES PATENTS

| | | |
|---|---|---|
| 2,818,322 | Blakely | Dec. 31, 1957 |
| 2,901,732 | Canning | Aug. 25, 1959 |